United States Patent
Ryu et al.

(10) Patent No.: US 10,858,537 B2
(45) Date of Patent: Dec. 8, 2020

(54) GAS-BARRIER FILM AND METHOD OF MANUFACTURING THE SAME

(71) Applicant: LG CHEM, LTD., Seoul (KR)

(72) Inventors: Sang Uk Ryu, Daejeon (KR); Dong Ryul Kim, Daejeon (KR); Seung Lac Ma, Daejeon (KR); Jang Yeon Hwang, Daejeon (KR); Jong Min Moon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 680 days.

(21) Appl. No.: 14/554,984

(22) Filed: Nov. 26, 2014

(65) Prior Publication Data

US 2015/0086778 A1    Mar. 26, 2015

Related U.S. Application Data

(63) Continuation of application No. PCT/KR2013/004841, filed on May 31, 2013.

(30) Foreign Application Priority Data

May 31, 2012   (KR) .................. 10-2012-0058018

(51) Int. Cl.
    *C09D 183/04* (2006.01)
    *B05D 7/04* (2006.01)
    (Continued)

(52) U.S. Cl.
    CPC .............. *C09D 183/04* (2013.01); *B05D 1/38* (2013.01); *B05D 7/04* (2013.01); *C08J 7/0423* (2020.01); *B32B 2307/7242* (2013.01); *B32B 2457/202* (2013.01); *C08J 2367/02* (2013.01); *C08J 2483/02* (2013.01); *C08J 2483/04* (2013.01); *Y10T 428/265* (2015.01); *Y10T 428/31663* (2015.04)

(58) Field of Classification Search
    None
    See application file for complete search history.

(56) References Cited

U.S. PATENT DOCUMENTS

| | | | |
|---|---|---|---|
| 6,855,396 B1 | 2/2005 | Mennig et al. | |
| 2007/0206286 A1* | 9/2007 | Fukushige | G02B 1/111 359/580 |

(Continued)

FOREIGN PATENT DOCUMENTS

| | | |
|---|---|---|
| CN | 1221324 C | 10/2005 |
| EP | 1711338 B1 | 4/2009 |

(Continued)

OTHER PUBLICATIONS

Machine translation KR 2009-0074998 (2009).*

*Primary Examiner* — Alexandre F Ferre
(74) *Attorney, Agent, or Firm* — Dentons US LLP

(57) ABSTRACT

The present application relates to gas barrier film having excellent adhesive strength and a method of manufacturing the same. Particularly, the present application is directed to providing a gas barrier film having excellent adhesion performance between an inorganic layer and a protective coating layer under harsh conditions by protective coating layer including inorganic nano particles surface-modified with organic silane on the inorganic layer.

16 Claims, 1 Drawing Sheet

(51) Int. Cl.
*B05D 1/38* (2006.01)
*C08J 7/04* (2020.01)

(56) References Cited

U.S. PATENT DOCUMENTS

| | | | | |
|---|---|---|---|---|
| 2007/0207298 | A1* | 9/2007 | Suzuki | G02B 1/118 428/216 |
| 2007/0267135 | A1* | 11/2007 | Kim | B32B 33/00 156/278 |
| 2012/0135216 | A1* | 5/2012 | Kwon | B82Y 30/00 428/220 |

FOREIGN PATENT DOCUMENTS

| | | |
|---|---|---|
| EP | 2357081 A2 | 8/2011 |
| JP | 2007-533860 | 11/2007 |
| KR | 10-2008-0012552 | 2/2008 |
| KR | 10-2008-0041399 | 5/2008 |
| KR | 10-2008-0100035 | 11/2008 |
| KR | 10-2009-0074998 | 7/2009 |
| KR | 10 2009 0077367 A | 7/2009 |
| KR | 10-2009-0085219 | 8/2009 |
| WO | 20051108642 | 11/2005 |

* cited by examiner

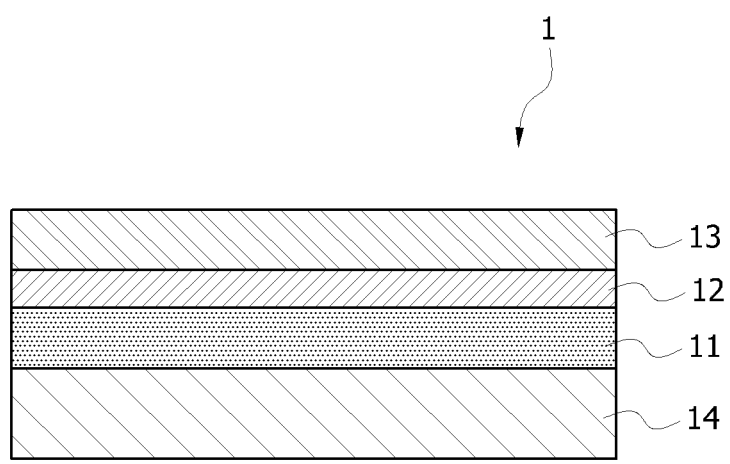

GAS-BARRIER FILM AND METHOD OF MANUFACTURING THE SAME

This application is a Continuation Bypass of International Application No. PCT/KR2013/004841, filed May 31, 2013, and claims the benefit of Korean Application No. 10-2012-0058018, filed on May 31, 2012, all of which are hereby incorporated by reference in their entirety for all purposes as if fully set forth herein.

CROSS-REFERENCE TO RELATED APPLICATION

1. Technical Field

The present application relates to a gas barrier film and a method of manufacturing the same.

2. Background Art

A glass substrate used in a display device, a picture frame, a handcraft, a packing material and a container has many advantages of a low coefficient of linear expansion, an excellent gas barrier property, a high light transmittance, a degree of surface planarization, excellent heat resistance and chemical resistance, but is vulnerable to impact, easily breakable, and has a high density and thus is heavy.

Recently, due to increasing interest in liquid crystal or organic light-emitting display devices and electronic paper, research on replacement of a substrate for a display device from glass to plastic is actively progressing. That is, when the glass substrate is replaced by a plastic substrate, a total weight of the display device is reduced, and flexibility in design may be provided. In addition, the plastic substrate may be more resistant to impact and economically feasible when manufactured in a continuous process than the glass substrate.

Meanwhile, a plastic film to be used as a substrate of the display device requires a high glass transition temperature to endure a process temperature of a transistor diode or a deposition temperature of a transparent electrode, an oxygen and vapor barrier characteristic to prevent aging of light crystal and organic light-emitting materials, a small coefficient of linear expansion and low dimensional stability to prevent distortion of the substrate with change in process temperature, a high mechanical strength that is compatible with a process apparatus used for the conventional glass substrate, chemical resistance to endure an etching process, a high light transmittance, a low double refractive index, and scratch resistance of a surface thereof.

However, since there is no high-performance polymer base film (including a polymer film and a polymer-inorganic material composite film) satisfying all of these conditions, attempts are being made to provide the above physical properties by coating several functional layers on the polymer base film. Examples of representative functional layers include an organic-inorganic hybrid layer to reduce defects generated on a polymer surface and give planarization, a gas barrier layer composed of an inorganic material to prevent flow of gases such as oxygen and vapor, and a protective coating layer to give scratch resistance to a surface thereof.

In many conventional multilayered plastic substrates, an inorganic material gas barrier layer is formed on a polymer base. Here, problems in the multilayered plastic substrate may be transformation of the polymer base and cracks and peeling occurring in an inorganic thin film due to a large difference in coefficient of linear expansion between the polymer base and the gas barrier layer. Accordingly, it is very important to design a suitable multilayered structure capable of minimizing stress at an interface between layers and having an adhesive property between coating layers.

Particularly, as disclosed in Japanese Patent Application Publication No. 2007-533860, plasma treatment is generally performed to increase interlayer interface adhesive strength. With this technique, adhesive strength between an inorganic layer and a protective coating layer is fair at room temperature, but decreases under harsh conditions due to distortion of the inorganic layer.

SUMMARY OF THE INVENTION

The present application is directed to providing a gas barrier film having excellent adhesion performance between an inorganic layer and a protective coating layer under harsh conditions.

One aspect of the present application provides a gas barrier film formed by sequentially stacking an organic-inorganic hybrid coating layer, an inorganic layer, and a protective coating layer including inorganic nano particles surface-modified with organic silane to reinforce adhesive strength on one or both surfaces of a base, and satisfying the following Equation 1.

$$X \geq 48 \quad \text{[Equation 1]}$$

Here, X is a time (h) for which adhesive strength between the inorganic layer and the protective coating layer is maintained to be 90% or more at 85° C. and a relative humidity of 85% as verified by performing a cross hatch cut test.

Another aspect of the present application provides a method of manufacturing a gas barrier film, which includes: forming an organic-inorganic hybrid coating layer with a sol-type coating composition on one or both surfaces of a base; forming an inorganic layer on the organic-inorganic hybrid coating layer; and forming a protective coating layer with a solution prepared by mixing the sol-type hydrolyzing solution and a solution including inorganic nano particles nano particles surface-modified with organic silane on the inorganic layer.

Hereinafter, embodiments of the present application will be described in further detail with reference to the accompanying drawings. Conventional or general-purpose functions or configurations may be omitted from the description and the accompanying drawings for the sake of clarity and concision. Thicknesses, sizes, proportions and shapes of layers and regions shown in the drawings may be exaggerated to provide clear illustration and therefore have no bearing on the scope of the present application.

The present application relates to a gas barrier film formed by sequentially stacking an organic-inorganic hybrid coating layer, an inorganic layer, and a protective coating layer including inorganic nano particles nano particles surface-modified with organic silane on one or both surfaces of a base, and satisfying the following Equation 1.

$$X \geq 48 \quad \text{[Equation 1]}$$

Here, X represents a time (h) for which adhesive strength between the inorganic layer and the protective coating layer is maintained to be 90% or more at 85° C. and a relative humidity of 85% as verified by performing a cross hatch cut test.

FIG. 1 is a cross-sectional view of a gas barrier film according to one embodiment of the present application. As shown in FIG. 1, the gas barrier film 1 of the present application sequentially includes a base 14, and an organic-inorganic hybrid coating layer 11, an inorganic layer 12 and a protective coating layer 13 including inorganic nano particles formed on the base 14.

The organic-inorganic hybrid coating layer 11 serves to reduce a large difference in coefficient of linear expansion between the base 14 and the inorganic layer 12, and to enhance adhesive strength between the base 14 and the inorganic layer 12 by suitably controlling a composition ratio of an organic material to an inorganic material. In addition, the organic-inorganic hybrid coating layer 11 may planarize a surface of the base, thereby minimizing defects generated during formation of the inorganic layer.

As the inorganic layer is a high-density inorganic layer having a low coefficient of linear expansion, gases such as oxygen and vapor may be blocked.

The protective coating layer having inorganic nano particles may enhance hardness and dimensional stability of a substrate surface.

The protective coating layer having inorganic nano particles more densely accelerates curing of the protective coating layer because the inorganic nano particles serve as peaks of physical crosslinking, and it reduces change in dimensions due to heat, producing the above effects.

As the base used in the present application, for example, a plastic film may be used, and the plastic film may be selected from the group consisting of a homopolymer, at least one of polymer blends, and a polymer composite material containing an organic or inorganic additive. As the polymer having such characteristics, for example, polyethyleneterephthalate, polyethylenenaphthalate, polyarylate, polycarbonate, polymethacrylate, a cyclic olefin copolymer, polystyrene, polyethersulfone, polyimide, polynorbornene, polyester, polyamide, an epoxy curing material, or a multi-functional acrylate curing material may be used.

In addition, in the present application, a plastic film formed by dispersing nano materials into a polymer may be used. As such a polymer composite material, a polymer-clay nano complex may be used. This may enhance mechanical physical properties and physical properties such as heat resistance, a gas barrier property and dimensional stability of the polymer with a smaller amount of clay than a complex such as conventionally used glass fiber, due to characteristics of a small particle size that may be less than 1 μm and a high aspect ratio of the clay. That is, to enhance the physical properties, it is important that the peeled clay layer is fully dispersed into a polymer matrix, and that the polymer-clay complex satisfies the above-described conditions. As the polymer capable of being used in the polymer-clay complex, a polystyrene, a polymethacrylate, a polyethyleneterephthalate, a polyethylenenaphthalene, a polyacrylate, a polycarbonate, a cyclic olefin copolymer, a polynorbornene, an aromatic fluorine polyester, a polyethersulfone, a polyimide, an epoxy resin or a multifunctional acrylate may be used, and as the clay, laponite, montmorillonite or megadite may be used.

In the present application, the base may be formed in a film or sheet having a thickness of 10 to 1000 μm. The base may be manufactured by a solution casting method or a film extrusion process, and preferably, after the manufacture of the base, the base may be annealed at approximately glass transition temperature for several seconds to minutes to minimize transformation according to a temperature.

After annealing, to enhance coatability and an adhesive property, primer coating may be performed on a surface of the plastic film, or surface treatment such as plasma treatment using corona, oxygen or nitrogen, UV-ozone treatment or reaction gas-added ion beam treatment may be performed.

The organic-inorganic hybrid coating layer is formed by curing the sol-type coating composition including organic silane by heat or UV rays, and the sol-type coating solution composition may occasionally include a suitable additive, solvent, polymerization catalyst, etc., as well as organic silane.

The organic silane may be a compound of Formula 1.

[Formula 1]

In Formula 1,

X may be the same as or different from each other, and represent hydrogen, halogen, an alkoxy group having 1 to 12 carbon atoms, an acyloxy group, an alkylcarbonyl group, an alkoxycarbonyl group, or $N(R^2)_2$ (here, $R^2$ is hydrogen or an alkyl group having 1 to 12 carbon atoms), $R^1$ may be the same as or different from each other, and represent an alkyl group having 1 to 12 carbon atoms, an alkenyl group, an alkynyl group, an aryl group, an arylalkyl group, an alkylaryl group, an arylalkenyl group, an alkenylaryl group, an arylalkynyl group, an alkynylaryl group, or an alkylcarbonyl group, and have an amino group, an amide group, an aldehyde group, a keto group, a carboxyl group, a mercapto group, a cyano group, a hydroxyl group, an alkoxy group having 1 to 12 carbon atoms, an alkoxycarbonyl group having 1 to 12 carbon atoms, a sulfonic acid, a phosphoric acid, an acryl group, a methacryl group, an epoxy group or a vinyl group as a substituent, and m is an integer from 1 to 3.

In addition, to increase a bond density of organic-inorganic coating, a coating solution may be prepared by adding an alkoxysilane additive having a urethane, urea, ether, or amino group produced by reacting 3-isocyanatopropyltri-alkoxysilane, glycidoxypropyltrialkoxysilane, glycidoxypropylmonoalkyldialkoxysilane, glycidoxypropyldialkyl-monoalkoxysilane, epoxycyclohexylethyltrialkoxysilane, epoxycyclohexylethylmono alkyldialkoxysilane, or epoxy-cyclohexylethyl alkylmonoalkoxysilane with a polyol, polythiol or polyamine.

The solvent may be a solvent used in conventional hydrolysis, for example, alcohol or distilled water.

In addition, the catalyst is not particularly limited, and may be, for example, aluminum butoxide, zirconium propoxide, an acid or a base.

Amounts of the additive, solvent and catalyst used herein are suitably selected as needed, and thus not particularly limited.

A content of the organic silane used in the organic-inorganic hybrid coating layer may be 5 to 35 or 7 to 30 parts by weight with respect to 100 parts by weight of the total coating composition.

When the inorganic layer including an inorganic material is formed on the organic-inorganic hybrid coating layer, a gas barrier film having excellent adhesive strength between the inorganic layer and the organic-inorganic hybrid coating layer, and an enhanced gas barrier characteristic by the inorganic layer, may be obtained.

Since values of oxygen permeability and vapor permeability of the base are generally several tens to thousands of units, to form the inorganic layer, a method of blocking oxygen and vapor by depositing or coating a transparent inorganic material having a high-density or a nanometer-sized thin metal thin film on a polymer film by a physical or chemical method may be used. Here, as a deposition coating method to form the inorganic barrier layer, sputtering, chemical deposition, ion plating, atomic layer epitaxy, plasma chemical deposition or a sol-gel method may be used.

Here, when a defect such as a pinhole or crack is present, it is difficult for the transparent inorganic oxidized thin film to provide a sufficient oxygen and vapor barrier effect, and it is difficult for a thin metal thin film to obtain a uniform thickness having a size of several nanometers without defects and to have a light transmittance in a visible region of more than 80%. A thickness of the inorganic layer formed by the above-described method may be 5 to 1000 nm, 7 to 500 nm, or 10 to 200 nm.

The inorganic layer may include a metal oxide or nitride, and the metal may be at least one selected from the group consisting of Al, Zr, Ti, Hf, Ta, In, Sn, Zn and Si.

The protective coating layer including inorganic nano particles surface-treated with organic silane formed on the inorganic layer may be manufactured by mixing a sol-type hydrolyzing solution including organic silane and a solution including inorganic nano particles surface-treated with organic silane, and coated with the mixed solution.

As the organic silane for reinforcing adhesive strength, the organic silane in the solution including surface-modified inorganic nano particles may be used in an amount of 10 to 500 or 20 to 400 parts by weight with respect to 100 parts by weight of the inorganic nano particles. Here, when less than 10 parts by weight of the organic silane is used, adhesion to the inorganic layer gives way to peeling in a test under harsh conditions, and when more than 500 parts by weight of the organic silane is used, it is difficult to expect any enhancement in adhesive strength.

The organic silane in the sol-type hydrolyzing solution may be used in an amount of 5 to 35 parts by weight with respect to 100 parts by weight of the total sol-type hydrolyzing solution. Here, when the organic silane is used in an amount of less than 5 parts by weight, there is a limit to protecting the inorganic layer because of a small coating thickness, and when the organic silane is used in an amount of more than 35 parts by weight, an increase in protection effect is insignificant.

The solution including inorganic nano particles that are surface-modified with organic silane to reinforce adhesive strength may enhance adhesive strength between the inorganic layers under harsh conditions when the particle surface is modified by putting the organic silane reinforcing the adhesive strength into the inorganic particle solution and reacting the organic silane on the surface of the inorganic particles while hydrolyzed with water and a catalyst.

The inorganic nano particles may be planar or spherical particles. A spherical particle may have a diameter of 1 to 100 nm, and a planar particle may have a height of 1 to 10 nm. Specific examples of the inorganic nano particles include alumina nano particles, silica nano particles, zinc oxide nano particles, antimony oxide nano particles, titanium oxide nano particles, and zirconium oxide nano particles.

The inorganic nano particles may be contained in an amount of 1 to 50 parts by weight with respect to 100 parts by weight of a solid content of a total composition of the protective coating solution, but the composition ratio may vary according to desired physical properties.

The protective coating layer has a thickness of 0.1 to 10 μm, or 0.2 to 5 μm.

In addition, still another aspect of the present application provides a method of manufacturing a gas barrier film, which includes forming an organic-inorganic hybrid coating layer with a sol-type coating composition on one or both surfaces of a base; forming an inorganic layer on the organic-inorganic hybrid coating layer; and forming a protective coating layer with a solution prepared by mixing a sol-type hydrolyzing solution and a solution including inorganic nano particles surface-modified with organic silane on the inorganic layer.

First, the sol-type coating composition is coated on one or both surfaces of a base and cured, thereby forming an organic-inorganic hybrid coating layer. The organic-inorganic hybrid coating layer may be manufactured by preparing a sol-type solution by hydrolyzing the coating composition, and coating the sol-type solution on the base and curing the coated solution. The coating method may be spin coating, roll coating, bar coating, dip coating, gravure coating or spray coating. The sol-type curing method may be thermal curing, UV curing, IR curing or high-frequency thermal treatment. The organic-inorganic hybrid coating layer may have a thickness of 0.1 to 10 μm or 0.2 to 5 μm to planarize a surface of the plastic base having a surface roughness of several tens to hundreds of nanometers. As the organic-inorganic hybrid coating layer has the above range of thickness, a rough surface is covered with a commercially available plastic film to planarize, thereby preventing local stress concentration. As a result, generation of cracks is minimized in bending, thermal contraction and expansion, and thus durability of the complex film may be enhanced. In addition, since an inorganic layer is deposited on the organic-inorganic hybrid coating layer, if the coating layer is not planarized, a defect is generated in the deposition of an inorganic layer, and therefore a gas barrier property is degraded. The lower the degree of surface planarization is, the higher the gas barrier property is. Accordingly, the degree of surface planarization of a dielectric layer may be within 2 nm (0.5~2 nm) or 1.5 nm (1.0~1.5 nm).

Subsequently, an inorganic layer is formed on the organic-inorganic hybrid coating layer. The inorganic layer may be manufactured by depositing or coating a transparent inorganic material having a high-density or a nanometer-thick thin metal film on an organic or organic-inorganic hybrid coating layer by a physical or chemical method. As the deposition or coating method, sputtering, chemical deposition, ion plating, atomic layer deposition, plasma chemical deposition or a sol-gel method may be used. A thickness of the inorganic layer formed by the above-described method may be 5 to 1000 nm, 10 to 500 nm, or 10 to 200 nm.

Finally, a gas barrier film is manufactured on the inorganic layer by forming a protective coating layer by mixing a sol-type hydrolyzing solution including organic silane and a protective coating solution including inorganic nano particles surface-modified with organic silane, and curing the mixed result. The protective coating layer may be manufactured by coating the protective coating solution by spin coating, roll coating, bar coating, dip coating, gravure coating or spray coating and curing the coated result by thermal curing, UV curing, IR curing or high-frequency thermal treatment, and a thickness after curing may be 0.1 to 10 μm, or 0.2 to 5 μm.

Moreover, in the present application, the gas barrier film may be used in all fields to which a conventional plastic film may be applied, for example, a display device, a photovoltaic cell, a packing material, a container, etc.

BRIEF DESCRIPTION OF THE DRAWINGS

The above and other objects, features, and advantages of the present application will become more apparent to those of ordinary skill in the art by describing in detail exemplary embodiments thereof with reference to the adhered drawings, in which:

FIG. 1 is a cross-sectional view of a gas barrier film according to one embodiment of the present application.

DETAILED DESCRIPTION OF EXEMPLARY EMBODIMENTS

Hereinafter, the present application will be described in detail with reference to Examples, but the scope of the present application is not limited to the following Examples.

Example 1

As a base, a PET film having a thickness of 100 μm (A4300, produced by Toyobo) was used.

A sol-type coating composition solution prepared by diluting 50 g of tetraethoxy orthosilicate and 50 g of 3-glycidoxypropyltrimethoxysilane in 150 g of ethanol, and adding 56.4 g of water and 1.6 g of 0.1N HCl to react at room temperature for 1 day, was coated on one surface of the PET film and cured at 120° C. for 10 minutes, thereby forming an organic-inorganic hybrid coating layer having a thickness of approximately 0.6 μm.

An inorganic layer formed of SiOx was deposited on the organic-inorganic hybrid coating layer to have a thickness of 34 nm using a sputtering technique while a mixed gas of argon and oxygen was provided to a deposition apparatus.

Separately, 10 g of 3-glycidoxypropyltrimethoxysilane and 10 g of tetraethoxy orthosilicate were diluted in 30 g of ethanol, 9.5 g of distilled water and 0.5 g of 0.1N HCl were added, and the resulting solution was hydrolyzed at room temperature for 24 hours, thereby preparing a sol-type solution (a).

10 g of MA ST produced by Nissan Chemical (silica nano particles, particle diameter: 10~15 nm, solid content: 30 wt %) was diluted in 10 g of methanol, 3.1 g of 3-glycidoxypropyltrimethoxysilane which is an organic silane having excellent adhesive strength, 6.8 g of distilled water and 0.1 g of 0.1N HCl were added, and the resulting solution was stirred at 60° C. for 4 hours and then cooled at room temperature, thereby preparing a solution (b) including silica nano particles surface-modified with organic silane.

7.2 g of the solution (a) was diluted with 14.6 g of ethanol and stirred at room temperature for 30 minutes, and 8.2 g of the solution (b) was added, thereby completing a protective coating solution. The protective coating solution was coated on the inorganic layer (SiOx layer) by bar coating and cured at 120° C. for 10 minutes, thereby forming a protective coating layer (thickness: 0.6 μm). As a result, a gas barrier film was manufactured.

Example 2

8 g of MA ST produced by Nissan Chemical (silica nano particles, particle diameter: 10~15 nm, solid content: 30 wt %) was diluted in 8 g of methanol, 3.7 g of 3-glycidoxypropyltrimethoxysilane, 8.2 g of distilled water and 0.1 g of 0.1N HCl were added, and the resulting solution was stirred at 60° C. for 4 hours and then cooled at room temperature, thereby preparing a solution (c) including the silica nano particles surface-modified with organic silane, instead of the solution (b) of Example 1.

A gas barrier film was manufactured as described in Example 1, except that 7.2 g of the solution (a) of Example 1 was diluted with 15 g of ethanol and stirred at room temperature for 30 minutes, and 7.2 g of the solution (c) was added, thereby completing a protective coating solution to be used in manufacturing a protective coating layer.

Example 3

A gas barrier film was manufactured by forming a protective coating layer (thickness: 0.6 μm) as described in Example 1, except that, in preparation of a solution (b), 8 g of alumina nano particles (average particle diameter: 20 nm, solid content: 30 wt %) were used instead of the silica nano particles.

Example 4

A gas barrier film was manufactured by forming a protective coating layer (thickness: 0.6 μm) as described in Example 1, except that, in preparation of a solution (b), 8 g of zinc oxide nano particles (average particle diameter: 30 nm, solid content: 30 wt %) were used instead of the silica nano particles.

Example 5

30 g of zinc oxide nano particles (average particle diameter: 5 nm, solid content: 10 wt %) were added to 3.1 g of 3-glycidoxypropyltrimethoxysilane, which is an organic silane for reinforcing adhesive strength, 6.8 g of distilled water and 0.1 g of 0.1N HCl, and the resulting solution was stirred at 60° C. for 4 hours and cooled at room temperature, thereby preparing a solution (d) including silica nano particles surface-modified with organic silane.

A gas barrier film was manufactured as described in Example 1, except that 7.2 g of the solution (a) of Example 1 was diluted in 12 g of ethanol and stirred at room temperature for 30 minutes, and 10.8 g of the solution (d) was added, thereby completing a protective coating solution to be used in manufacturing a protective coating layer.

Example 6

A gas barrier film was manufactured by forming a protective coating layer (thickness: 0.6 μm) as described in Example 1, except that, in preparation of a solution (b), 8 g of antimony oxide nano particles (average particle diameter: 30 nm, solid content: 30 wt %) were used instead of the silica nano particles.

Example 7

A gas barrier film was manufactured as described in Example 1, except that an inorganic layer formed of AlOx was deposited on an organic-inorganic hybrid coating layer to have a thickness of 35 nm using a sputtering technique while a mixed gas of argon and oxygen was provided to a deposition apparatus.

Comparative Example 1

When Inorganic Nano Particles Were Not Surface-Treated With Organic Silane

A gas barrier film was manufactured as described in Example 1, except that a protective coating solution composed of 10 parts by weight of non-surface-treated silica nano particles (average particle diameter: 10~15 nm) and 90 parts by weight of the solution (a) of Example 1 was prepared to be used in manufacturing a protective coating layer, instead of the solution (b) of Example 1.

Comparative Example 2

When a Hydrolyzing Solution Including no Silane Was Used 20 g of tetraethoxy orthosilicate was diluted in 35 g of ethanol, 11.4 g of distilled water and 0.5 g of 0.1N HCl were added, and the resulting solution was hydrolyzed at room temperature for 24 hours, thereby preparing a sol-type solution (f).

11.3 g of the solution (f) was diluted with 10.3 g of ethanol and stirred at room temperature for 30 minutes, and 8.2 g of the solution (b) of Example 1 was added, thereby preparing a protective coating solution. The protective coating solution was coated on the inorganic barrier layer (SiOx layer) of the Example 1 and cured at 120° C. for 10 minutes, thereby forming a protective coating layer (thickness: 0.6 μm).

Experimental Example 1

Confirmation of Adhesive Strength

Adhesive strengths of the plastic films of Examples 1 to 6 and Comparative Examples 1 to 3 were measured according to the following criteria of the cross hatch cut test.

The cross hatch cut test was performed according to ASTM D 3002/D3359.

A sample film was cut horizontally and vertically into 11 rows and columns at intervals of 1 mm using a knife to create a grid of 100 squares each having a size of 1 mm×1 mm (width x length). A CT-24 adhesive tape produced by Nichiban was attached to a test surface and detached to measure adhesive strength between the inorganic barrier layer and the protective coating.

In addition, the plastic film was left for 2, 5 and 7 days under harsh conditions (85° C./relative humidity: 85%), and then the cross hatch cut test was performed by the same method as described above.

[Evaluation Criteria]
○: 90% or more of the grids were attached to the surface
Δ: 50 to 90% of the grids were attached to the surface
X: less than 50% of the grids were attached to the surface A gas barrier film can be used in all fields to which a conventional plastic film can be applied, for example, a display device, a photovoltaic cell, a packing material, a container, etc., by enhancing adhesive strength between an inorganic layer and a protective coating layer under harsh conditions.

While the invention has been shown and described with reference to certain exemplary embodiments thereof, it will be understood by those skilled in the related art that various changes in form and details may be made therein without departing from the scope of the invention as defined by the appended claims.

What is claimed is:
1. A gas barrier film, comprising:
an organic-inorganic hybrid coating layer comprising a cured product of a sol-type hydrolyzed composition containing tetraethoxy orthosilicate and 3-glycidoxy-propyl-trimethoxysilane;
an inorganic layer; and
a protective coating layer including inorganic nanoparticles surface-modified with an organic silane, the layers being sequentially stacked on one surface or both surfaces of a base, wherein:
the inorganic nanoparticles are at least one selected from the group consisting of alumina nanoparticles, zinc oxide nanoparticles, antimony oxide nanoparticles, titanium oxide nanoparticles, and zirconium oxide nanoparticles;
the inorganic nanoparticles are spherical and have a diameter of 20 to 100 nm; and
the organic silane is 3-glycidoxypropyltrimethoxysilane or a compound of Formula 1:

$$R^1_m SiX_{4-m}$$ [Formula 1]

wherein:
X is the same as or different from each other, and each independently is hydrogen, halogen, an alkoxy group having 1 to 12 carbon atoms, an acyloxy group, an alkylcarbonyl group, an alkoxycarbonyl group, or $N(R^2)_2$ wherein $R^2$ is hydrogen or an alkyl group having 1 to 12 carbon atoms;
$R^1$ is the same as or different from each other, and each independently represents an alkenyl group, an alkynyl group, an arylalkynyl group, an alkynylaryl group, or an alkylcarbonyl group, and has as a substituent an amino group, an amide group, an aldehyde group, a keto group, a carboxyl group, a mercapto group, a cyano group, a hydroxyl group, an alkoxy group having 1 to 12 carbon atoms, an alkoxycarbonyl group having 1 to 12 carbon atoms,

| Condition | Example 1 | Example 2 | Example 3 | Example 4 | Example 5 | Example 6 | Example 7 | Comparative Example 1 | Comparative Example 2 |
|---|---|---|---|---|---|---|---|---|---|
| RT* (5 days) | ○ | ○ | ○ | ○ | ○ | ○ | ○ | ○ | Δ |
| HC** (2 days) | ○ | ○ | ○ | ○ | ○ | ○ | ○ | Δ | Δ |
| HC (5 days) | ○ | ○ | ○ | ○ | ○ | ○ | ○ | X | Δ |
| HC (7 days) | ○ | ○ | ○ | ○ | ○ | ○ | ○ | X | X |

*RT: room temperature
**HC: harsh conditions a sulfonic acid, a phosphoric acid, an acryl group, a methacryl group, an epoxy group or a vinyl group; and m is an integer from 1 to 3.

2. The film according to claim 1, which satisfies Equation 1:

X≥48         [Equation 1]

wherein X represents a time (h) for which adhesive strength between the inorganic layer and the protective coating layer is maintained to be 90% or more at 85° C. and a relative humidity of 85% as verified by performing a cross hatch cut test.

3. The film according to claim 1, wherein the protective coating layer includes at 10 to 500 parts by weight of organic silane with respect to 100 parts by weight of the inorganic nanoparticles.

4. The film according to claim 1, wherein the base is a plastic film.

5. The film according to claim 4, wherein the plastic film is at least one selected from the group consisting of a homopolymer, at least one of polymer blends, and a polymer composite material containing an organic or inorganic additive.

6. The film according to claim 1, wherein the inorganic layer includes a metal oxide or nitride.

7. The film according to claim 6, wherein the metal is at least one selected from the group consisting of Al, Zr, Ti, Hf, Ta, In, Sn, Zn and Si.

8. The film according to claim 1, wherein the organic-inorganic hybrid coating layer has a thickness of 0.1 to 10 μm.

9. The film according to claim 1, wherein the inorganic layer has a thickness of 5 to 1000 nm.

10. The film according to claim 1, wherein the protective coating layer has a thickness of 0.1 to 10 μm.

11. A display device, comprising:
the gas barrier film according to claim 1.

12. A photovoltaic cell according to claim 1, comprising:
the gas barrier film according to claim 1.

13. A food packaging material, comprising:
the gas barrier film according to claim 1.

14. The film according to claim 1, wherein the organic silane is 3-glycidoxy-propyltrimethoxysilane.

15. A method of manufacturing a gas barrier film, comprising:

forming an organic-inorganic hybrid coating layer containing a reaction product obtained by curing a sol-type hydrolyzed coating composition comprising tetraethoxy orthosilicate and 3-glycidoxy-propyltrimethoxysilane on one or both surfaces of a base;

forming an inorganic layer on the organic-inorganic hybrid coating layer; and forming a protective coating layer with a solution prepared by mixing a sol-type hydrolyzing solution and a solution including inorganic nanoparticles surface-modified with organic silane on the inorganic layer, wherein:

the inorganic nanoparticles are spherical and have a diameter of 20 to 100 nm; and the inorganic nanoparticles are at least one selected from the group consisting of alumina nanoparticles, zinc oxide nanoparticles, antimony oxide nanoparticles, titanium oxide nanoparticles, and zirconium oxide nanoparticles.

16. The method according to claim 15, wherein the organic silane is 3-glycidoxypropyltrimethoxysilane or a compound of Formula 1:

          [Formula 1]

where X is the same as or different from each other, and each independently is hydrogen, halogen, an alkoxy group having 1 to 12 carbon atoms, an acyloxy group, an alkylcarbonyl group, an alkoxycarbonyl group, or $N(R^2)_2$ wherein $R^2$ is hydrogen or an alkyl group having 1 to 12 carbon atoms;

$R^1$ is the same as or different from each other, and each independently is an alkenyl group, an alkynyl group, an arylalkyl group, an alkylaryl group, an arylalkenyl group, an alkenylaryl group, an arylalkynyl group, an alkynylaryl group, or an alkylcarbonyl group, and has as a substituent an amino group, an amide group, an aldehyde group, a keto group, a carboxyl group, a mercapto group, a cyano group, a hydroxyl group, an alkoxy group having 1 to 12 carbon atoms, an alkoxycarbonyl group having 1 to 12 carbon atoms, a sulfonic acid, a phosphoric acid, an acryl group, a methacryl group, an epoxy group or a vinyl group; and m is an integer from 1 to 3.

\* \* \* \* \*